United States Patent Office 2,762,184
Patented Sept. 11, 1956

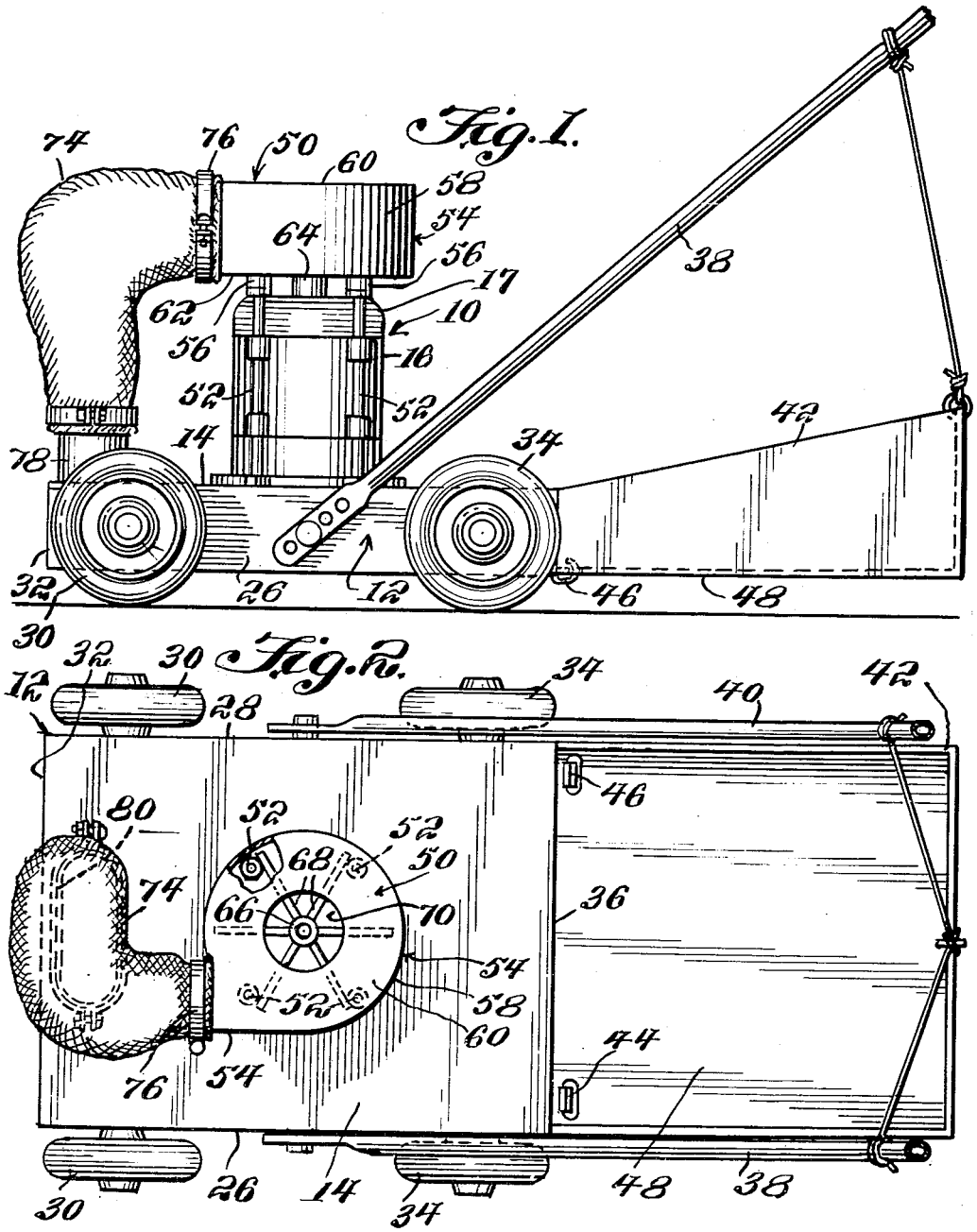

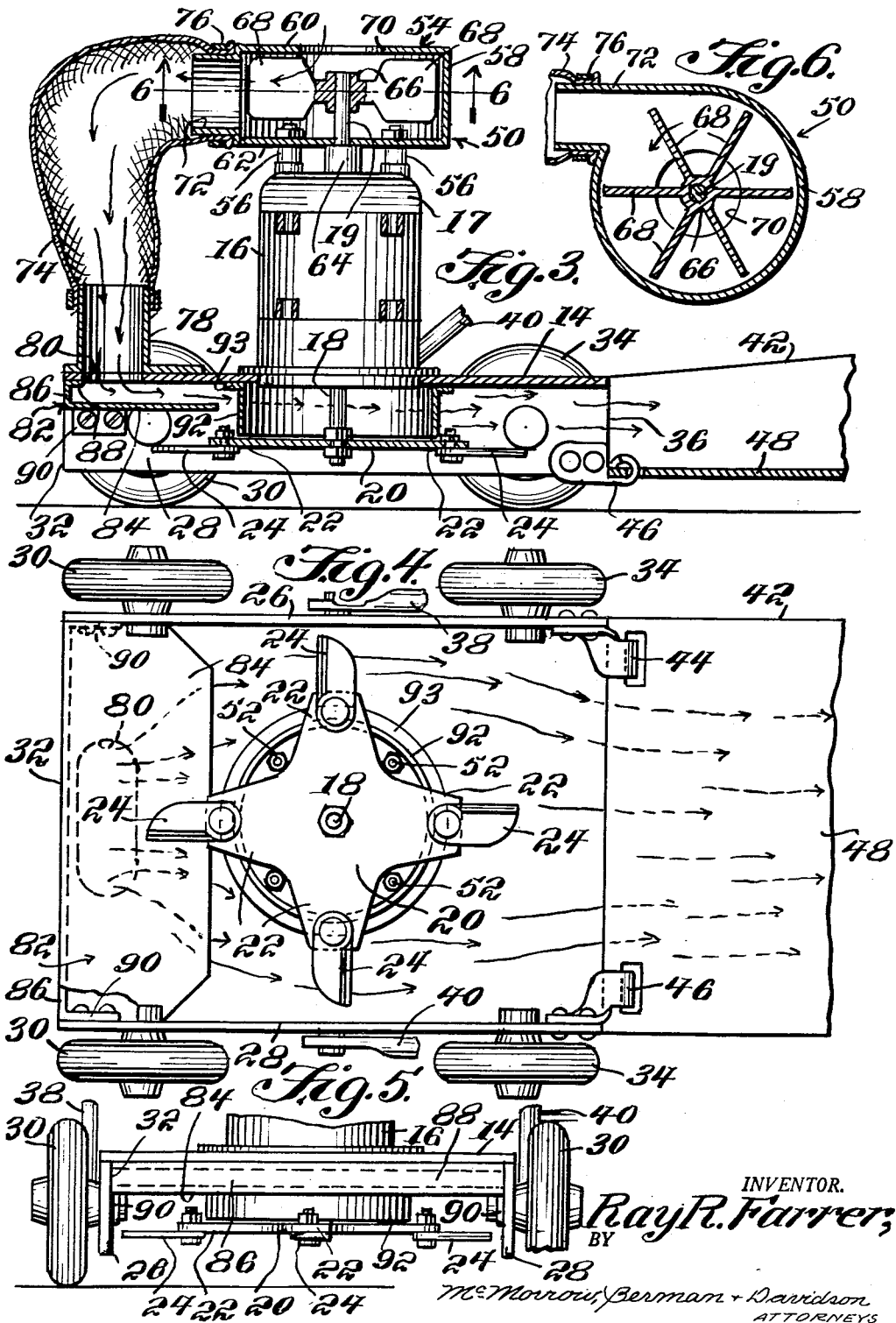

2,762,184

BLOWER ATTACHMENT FOR LAWN MOWERS

Ray R. Farrer, Odessa, Tex.

Application May 11, 1954, Serial No. 429,074

4 Claims. (Cl. 56—25.4)

This invention relates to power lawn mowers, and more particularly to a blower attachment for such lawn mowers.

It is the primary object of this invention to provide a blower attachment for power lawn mowers which will derive its operation from the source of power of the lawn mower and will create an air current or stream of air to direct the severed grass transversely of the mower housing to a receptacle carried by the lawn mower to thus eliminate the necessity of raking the cut or severed grass after the lawn mower has been used.

It is a further object of this invention to provide a blower attachment for power lawn mowers which may be readily adapted for use with any type of power lawn mower without requiring a substantial change in the construction of the mower.

Yet another object of this invention is to provide a blower attachment for power lawn mowers which is of simple construction requiring a minimum number of moving parts, and which is rugged and durable in use over extended periods of time and requires a minimum of maintenance.

Other objects and advantages will become apparent from a consideration of the following description, forming the specification, taken in conjunction with the accompanying drawings, in which:

Figure 1 is a side elevational view of a power lawn mower provided with the blower attachment embodying this invention;

Figure 2 is a top plan view;

Figure 3 is an enlarged vertical cross sectional view taken longitudinally of the lawn mower and attachment, parts of which are shown in elevation;

Figure 4 is an enlarged bottom plan view.

Figure 5 is an enlarged fragmentary front elevational view of the lower portion or housing of the lawn mower; and Figure 6 is a horizontal cross sectional view taken on line 6—6 of Figure 3.

With continued reference to the drawings, there is shown a power lawn mower, generally indicated at 10, which includes a housing, generally indicated at 12, which is shown as being of generally rectangular shape, although this shape may take any of the conventional forms such as being substantially circular or oval. The housing 12 has mounted on its upper surface 14 a motor 16 of the electric type, although it will be appreciated that an internal combustion type motor may be equally well employed, having a double-ended drive shaft, that is the drive shaft extends from the opposite ends of the motor.

One end 18 of the motor shaft extends through a suitably formed opening in the top surface or plate 14 of the housing and is disposed within the housing to have secured thereon a blade 20 for rotation therewith, the blade 20 having a plurality of outwardly and radially extending arms 22, the distal ends of which have secured thereto outwardly and longitudinally extending cutters 24 which sever the grass upon rotation of the blade caused by operation of the motor 16. The housing 12 has a pair of dependent side flanges 26 and 28 which extend along opposite longitudinal edges of the upper plate 14 and between which the blade 20 may rotate so as to be considered as rotating within the housing 12. The front and rear of the housing 12 are open.

A pair of front wheels 30 are rotatably journaled in the opposite, parallel depending flanges 26 and 28 respectively adjacent the front end 32 of the housing while a similar pair of rear wheels 34 are journaled in the respective depending flanges 26 and 28 adjacent the rear end 36 of the housing 12, so that the housing 12 is supported above the ground surface for movement thereacross.

A pair of spaced, parallel, upwardly and outwardly extending handles 38 and 40 are secured at their lower ends for limited pivotal movement on the respective depending flanges 26 and 28. A grass catching tray or basket 42 is carried by the housing 12 and extends longitudinally therefrom at the rear end 36 thereof, the tray or basket being secured on a pair of brackets 44 and 46 secured to the inner surfaces of the respective depending flanges 26 and 28 rearwardly of the journaled location of the rear wheels 34. The front end of the basket is open and is of the same extent as the open rear end of the housing so as to be generally coextensive therewith with the bottom 48 of the tray or basket 42 being in longitudinal alignment with the lower edges of the flanges 26 and 28.

A blower, generally indicated at 50, is mounted upon a plurality of spaced standards or brackets 56 carried by and extending upwardly from the top of the upper motor end 17. Thus, the blower 50 will be disposed above the upper end 17 of the motor 16. The other end of the motor drive shaft, indicated at 19, is arranged to be centrally disposed within the housing 54 of the blower 50. The motor 16 is surrounded by a plurality of angularly spaced apart standards 52 carried on the plate 14.

The housing 54 is of generally hollow cylindrical form having a side wall 58 and upper and lower walls 60 and 62. As will be clearly seen in Figure 3, the brackets 56 are secured to the lower wall 62 which will also include a suitably formed opening through which the drive shaft end 19 may extend into the interior of the housing 54, and the drive shaft also carries a spacer collar 64 interposed between the outer surface of the lower wall 62 and the adjacent end surface of the motor 16 for the purpose of maintaining the shaft in proper axial alignment and preventing undue distortion thereof.

A rotatable blower blade 66 is carried on the drive shaft end 19 disposed within the blower housing 54 for rotation with the drive shaft of the motor, and the blade 66 carries thereon a plurality of radially extending vanes or paddles 68 which will create an air current or air flow by drawing air through the central, circular opening 70 in the upper wall 60 of the housing 54 and will discharge this air through a cylindrical discharge opening 72 which is preferably formed integrally with the blower housing 54 and extending tangentially therefrom.

A flexible, generally cylindrical, conduit 74 of relatively stiff material, has one end thereof secured about the discharge pipe 72 by a ring bracket 76 and extends longitudinally therefrom and is bent, in the form of an elbow, downwardly so that its other end may be secured about the upper end of an upstanding pipe or conduit 78 having laterally extending flanges at its lower end secured upon the upper surface of the top plate 14 of the housing 12 adjacent the front end 32 thereof and intermediate the sides thereof from which the flanges 26 and 28 depend.

The lower end of the upstanding pipe 78 is so formed as to mate with an elongated, generally elliptical opening 80 through the top plate or wall 14 of the housing 12 centrally intermediate its sides and adjacent the front end 32 thereof.

An air deflector, generally indicated at 82, extends transversely across the front end 32 of the housing 12 and has its horizontally extending, generally rectangular body portion 84 in spaced parallel relation to the upper plate or wall 14 of the housing and disposed beneath, and extending in a direction toward the rear end 36 of the housing.

The air deflector 82, as shown in Figures 4 and 5, will extend between the depending flanges 26 and 28 of the housing 12 and disposed in a horizontal plane between the rotatable cutter blade 20 and the upper plate or wall 14 of the housing 12. The deflector 82 includes an end wall 86 which is disposed perpendicularly to the body 84 and extends transversely thereacross and across the front end 32 of the housing 12. An inturned flange 88 is disposed in face to face relation with the underside of the upper wall 14 and may be secured thereto as by being welded. A pair of brackets 90 carried by the respective depending flanges 26 and 28 adjacent the front end 32 of the housing 12 provide additional support for the body or horizontally extending plate of the air deflector 82.

As clearly shown in Figure 3, the end of the body or horizontally extending plate 84 of the air deflector 82 terminates at a location within the housing 12 spaced from a circular air excluding ring 92 having an outwardly extending peripheral flange 93 which may be secured to the undersurface of the top plate 14 of the housing 12 centrally intermediate its ends and concentric with the axis of the motor drive shaft to both exclude air from this area which it surrounds about the lower end 18 of the motor drive shaft and the upper surface of the cutter blade 20 from which it is slightly spaced, and to deflect air current induced by rotation of the blower blade 66 and deflected by the air deflector 82 so that the air current or stream will flow across the cutter blade 20 and be also directed therebeneath so that the grass severed by the cutters 24 on the cutter blade will be carried through the open rear end 36 of the housing 21 and deposited in the tray or basket 42. It will be seen, that the peripheral flange 93 is the means whereby the air excluding ring 92 may be secured to the undersurface of the upper plate or wall 14 of the housing 12 so as to have the ring dependingly carried thereby.

The ordinary flow of air through the housing 12 from the open front end to the open rear end thereof is indicated by the arrows in Figure 4, and this natural air flow is in the same direction as the air current or stream produced by the blower 50 and deflected across and beneath the cutter blade 20 so that it will be discharged through the open rear end 36 of the housing 12. The flow of the air stream or current generated by the blower 50 is indicated by arrows in Figures 3 and 4.

From the foregoing, it will be apparent that the power lawn mower includes a housing 12 provided with an open end 36 defining an air outlet and carrying a motor having its drive shaft extending from opposite ends thereof with one of the motor shaft ends extending within the housing to carry a cutter blade 20 rotatably thereon, a blower mounted on the housing 12 and operatively connected to the other end 19 of the motor shaft, a conduit means defined by the tube or conduit 74 and the upstanding pipe 78 extending between the blower 50 and the housing 12 to conduct the air current directed or generated by the blower into the housing 12 at one end 43 thereof remote from the outlet end 36, and an air deflector 82 carried by the housing 12 and disposed therewithin at the end 32 thereof remote from the outlet or rear end 36 to direct the flow of air transversely of the housing to discharge severed grass through the outlet end 36.

Also, there has been provided a blower attachment for a power lawn mower 10 which has a housing 12 provided with an open end 36 which defines an air outlet, the attachment including a blower 50 operatively connected to the mower motor 16 and carried by the housing in spaced relation thereto, a conduit, defined by the conduit elements 74 and 78, to conduct the stream of air generated by the blower 50 into the housing 12, and an air deflector 82 carried by the housing 12 and disposed therewithin and in the path of the air current to direct the flow of air current transversely of the housing to discharge severed grass through the rear or outlet, open end 36 of the housing 12.

While there are shown and described the preferred embodiment of the invention, it is to be understood that the structure is susceptible to change and modification within the practicability of the invention, and therefore should be limited only by the scope of the claims appended hereto.

What is claimed is:

1. In a power lawn mower including a housing provided with an open end defining an air outlet, a motor having its drive shaft extending from opposite ends carried by said housing with one of the motor shaft ends extending within said housing, a cutter blade rotatably carried by said one shaft end; a blower mounted on said housing and operatively connected to the other end of the motor shaft, conduit means between said blower and said housing to conduct the air current generated by said blower into said housing at the end thereof remote from said outlet, and an air deflector carried by said housing disposed therewithin at the end thereof remote from said outlet end to direct the flow of air transversely of said housing to discharge severed grass through said outlet.

2. In a power lawn mower including a housing provided with an open end defining an air outlet a motor having its drive shaft extending from opposite ends carried by said housing with one of the motor shaft ends extending within said housing, a cutter blade rotatably carried by said one shaft end; a blower mounted on said housing and operatively connected to the other end of the motor shaft, conduit means between said blower and said housing to conduct the air current generated by said blower into said housing at the end thereof remote from said outlet, and an air deflector carried by said housing disposed therewithin at the end thereof remote from said outlet end to direct the flow of air transversely of said housing to discharge severed grass through said outlet, said blower comprising a housing having a tangential opening, a blower blade disposed within said housing and carried by said other end of the motor drive shaft, and said blower housing having an air inlet opening therein through which air may be drawn upon operation of said blower blade and be discharged through said tangential opening, said conduit having one end in communication with said tangential opening.

3. In a power lawn mower including a housing provided with an open end defining an air outlet, a motor having its drive shaft extending from opposite ends carried by said housing with one of the motor shaft ends extending within said housing, a cutter blade rotatably carried by said one shaft end; a blower mounted on said housing and operatively connected to the other end of the motor shaft, conduit means between said blower and said housing to conduct the air current generated by said blower into said housing at the end thereof remote from said outlet, and an air deflector carried by said housing disposed therewithin at the end thereof remote from said outlet end to direct the flow of air transversely of said housing to discharge severed grass through said outlet, said housing including a top wall, a depending flange carried by said top wall along opposite sides thereof, said top wall having an opening therethrough adjacent its end remote from said outlet end, an upstanding pipe carried by said top wall in mating relation with said opening, and a conduit extending between said pipe and said blower to conduct the air current generated by said blower into said housing and against said air deflector through said pipe.

4. In a power lawn mower including a housing provided with an open end defining an air outlet, a motor having its drive shaft extending from opposite ends carried by said housing with one of the motor shaft ends extending within said housing, a cutter blade rotatably carried by said one shaft end; a blower mounted on said housing and operatively connected to the other end of the motor shaft, conduit means between said blower and said housing to conduct the air current generated by said blower into said housing at the end thereof remote from said outlet, and an air deflector carried by said housing disposed therewithin at the end thereof remote from said outlet end to direct the flow of air transversely of said housing to discharge severed grass through said outlet, said blower comprising a housing having a tangential opening, a blower blade disposed within said housing and carried by said other end of the motor drive shaft, and said blower housing having an air inlet opening therein through which air may be drawn upon operation of said blower blade and be discharged through said tangential opening, said conduit having one end in communication with said tangential opening, said housing including a top wall, a depending flange carried by said top wall along opposite sides thereof, said top wall having an opening therethrough adjacent its end remote from said outlet end, an upstanding pipe carried by said top wall in mating relation with said opening, and a conduit extending between said pipe and said blower to conduct the air current generated by said blower into said housing and against said air deflector through said pipe.

References Cited in the file of this patent
UNITED STATES PATENTS

| | | |
|---|---|---|
| 1,794,658 | Walsh | Mar. 3, 1931 |
| 2,071,872 | Cockburn | Feb. 23, 1937 |
| 2,531,081 | Shippey | Nov. 21, 1950 |
| 2,539,779 | Grosso | Jan. 30, 1951 |
| 2,641,100 | Sylvester | June 9, 1953 |